Patented Oct. 13, 1953

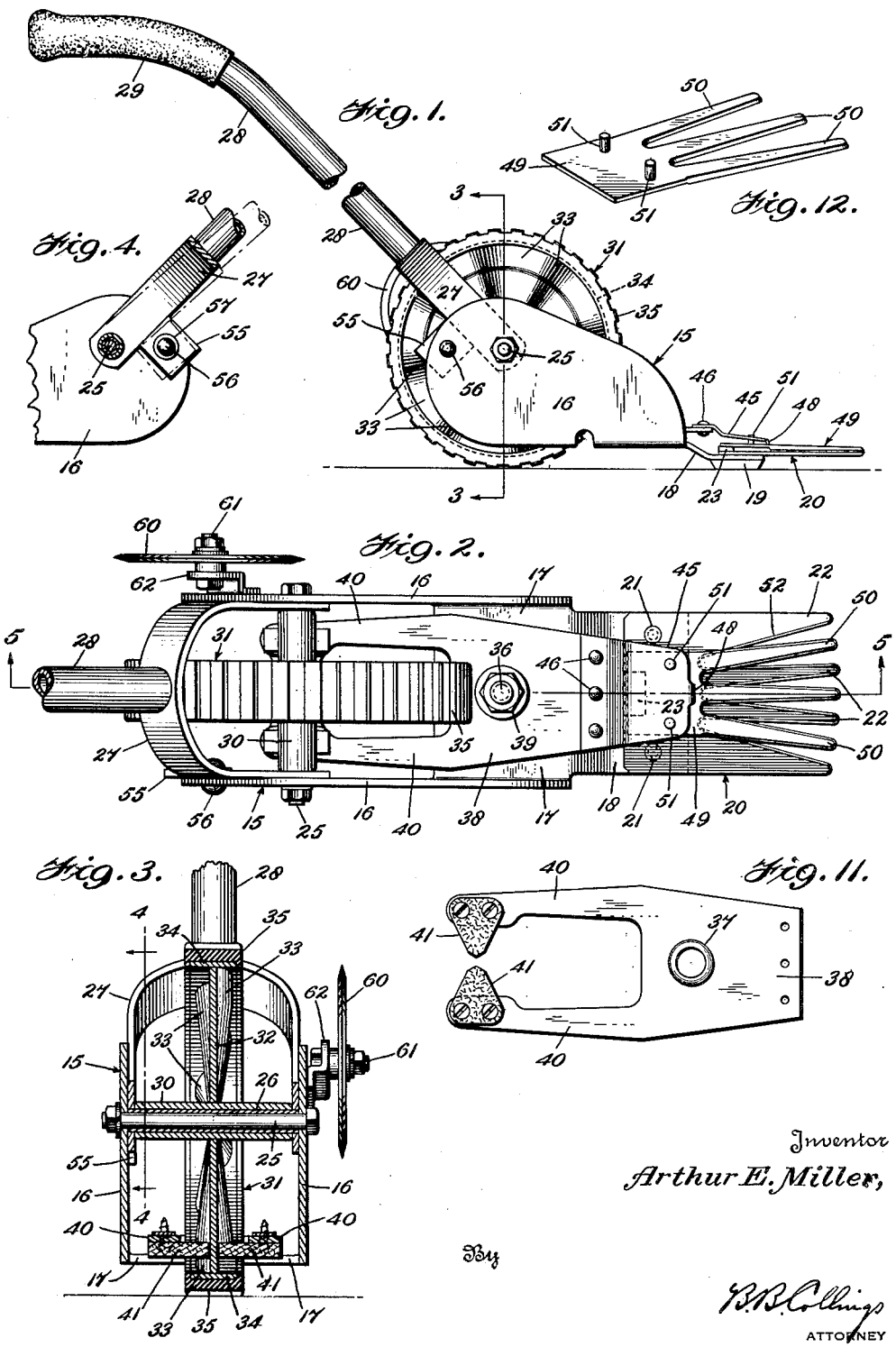

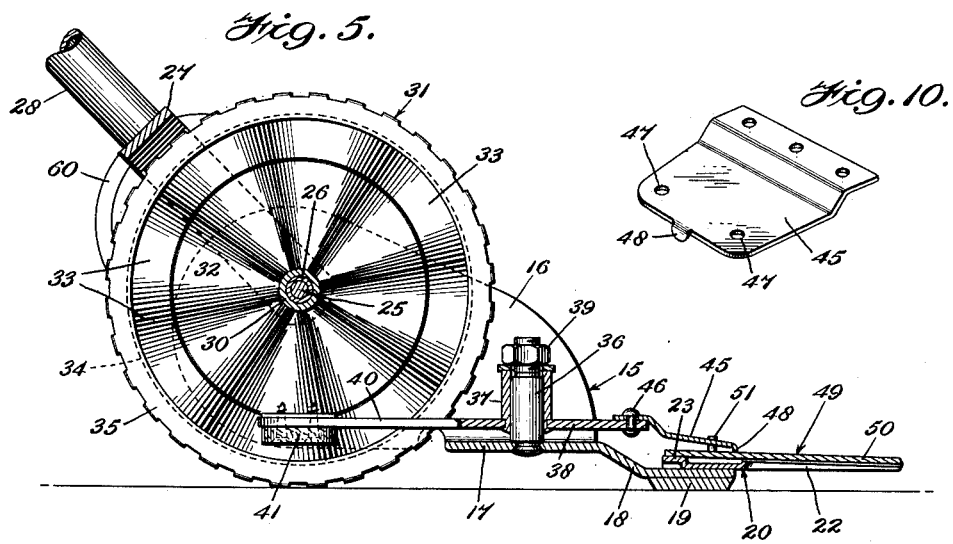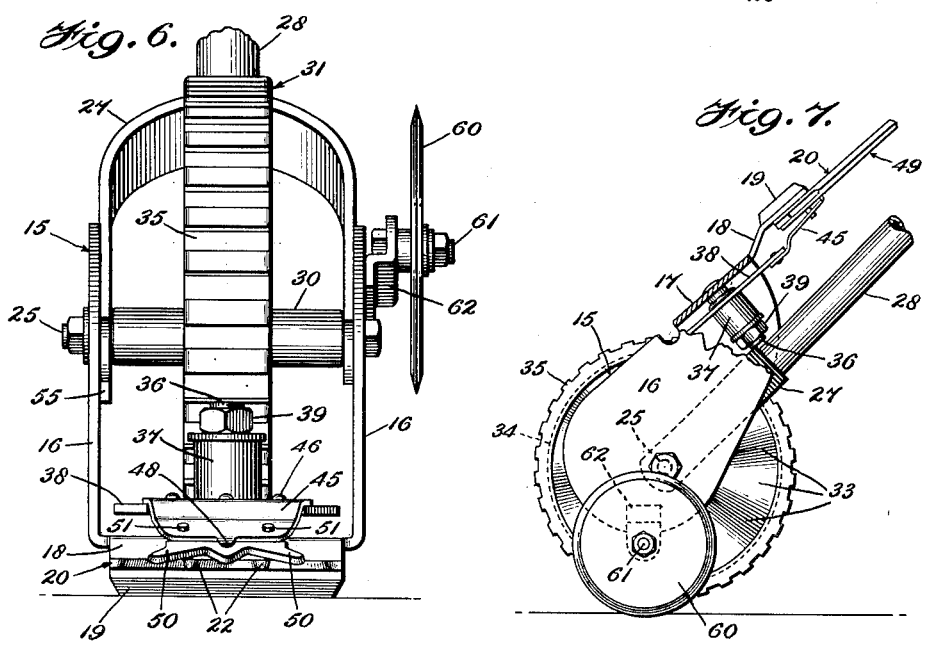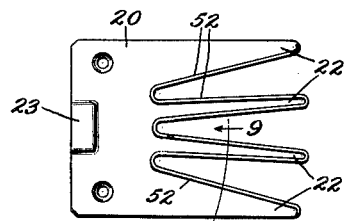

2,654,985

UNITED STATES PATENT OFFICE 2,654,985

LAWN TRIMMER AND EDGER

Arthur E. Miller, Milwaukee, Wis.

Application March 21, 1949, Serial No. 82,523

7 Claims. (Cl. 56—246)

The invention relates to lawn trimmers and edgers, and represents a further development of the machine disclosed and claimed in my prior application Serial No. 714,035 filed December 4, 1946, which has matured into Patent No. 2,503,348, dated April 11, 1950.

These machines are of a relatively narrow, light-weight manually operated type especially adapted for trimming the edge portions of lawns along walks, pavements, copings, flower beds, etc., rather than for cutting the grass in the body portion of the lawn, and they comprise an oscillatory shear device normally operating in a substantially horizontal plane at the front of the machine, which shear is driven by cams carried by a single supporting wheel disposed toward the rear. The shear operates quite close to the ground surface and is carried by a frame which mounts the wheel axle and is vertically swingable about the axis thereof, whereby the shear may rise and fall to follow unevennesses in said surface. The handle by means of which the machine is traversed over the ground extends to the rear and is pivotally mounted on the said axle independently of the shear frame so that the latter may rise and fall without corresponding movements of the handle.

It is one of the objects of the present invention to provide an improved shear construction and an improved drive for the oscillatory shear blade of a machine of the type above described.

A further object of the invention is to provide a machine for trimming the edge portions of lawns having, in addition to the horizontally operating shear mechanism, a rotatable disk cutter adapted to function in a vertical plane along the edges of walks, copings, etc., which disk is so mounted on the shear frame as to occupy an elevated inoperative position when the shear is in its normal functioning position. The edger disk however, may be easily brought to an operative position by merely swinging the shear frame upwardly about the axle to an elevated rearward position above the handle, which movement lowers the edger disk into ground engagement for traverse in contact with or proximity to the edge of a pavement, coping or the like. In this position the disk axis is so disposed relative to that of the supporting wheel that the force exerted by the operator on the handle in traversing the machine over the ground tends to prevent the shear frame from swinging back to its normal position.

Other objects will appear as the description proceeds.

A typical embodiment of the invention is illustrated in the accompanying drawings forming a part of this specification, wherein like reference characters designate like parts in all the views, and in which:

Figure 1 is a side elevational view of the machine, partly broken away, and with the shear frame and shear shown in their normal operating positions;

Fig. 2 is a plan view thereof, on a somewhat larger scale;

Fig. 3 is a vertical sectional view on the same scale as Fig. 2, on the plane indicated by the line 3—3 in Fig. 1, looking in the direction of the arrows;

Fig. 4 is a fragmentary sectional-elevational view on the plane indicated by the line 4—4 in Fig. 3, looking in the direction of the arrows;

Fig. 5 is a longitudinal sectional view on approximately the plane indicated by the line 5—5 in Fig. 2, and on the same scale as such figure, looking in the direction of the arrows;

Fig. 6 is a front elevational view of the machine on a still larger scale, as seen from the right of Fig. 5;

Fig. 7 is an elevational view of the side of the machine opposite to that shown in Fig. 1, and showing the shear and shear frame swung upwardly and rearwardly to bring the edger disk into its operative position;

Fig. 8 is a detail plan view of the lower or fixed shear blade;

Fig. 9 is an enlarged detail sectional view on the line 9—9 of Fig. 8;

Fig. 10 is a detail perspective view of the spring which retains the upper or movable shear blade in position, and transmits oscillatory movement thereto;

Fig. 11 is an inverted plan view of the actuating member to which the aforesaid spring is attached, and which is oscillated by the wheel cams; and Fig. 12 is a detail perspective view of the upper or movable shear blade.

Referring to the said drawings in detail, the shear frame 15 comprises a stamped sheet metal member having a pair of upright transversely spaced side plates 16, the lower forward portions of which are connected by an integral horizontal cross member 17 having a downwardly offset tongue 18 extending forwardly of the side plates and provided, if desired, with a ground engaging shoe 19. The fixed shear blade 20 is rigidly secured to the upper face of the tongue 18 by rivets 21, with its radiating teeth 22 projecting forwardly of the tongue. The rearward portion of the fixed shear blade is provided with a medially disposed boss 23, the upper face of which constitutes a slide bearing surface for the movable shear blade, as will appear more fully below.

The rearward portion of the side plates 16 mounts a transverse axle bolt 25 which is surrounded by a sleeve 26, the ends of which abut the inner faces of the side plates to maintain the transverse spacing of the latter. The lower ends of an inverted U-shaped handle member 27 are journaled on the end portions of the sleeve 26

(see Fig. 3) and a tubular handle 28 is rigidly secured to the medial portion of said member, from which it extends upwardly and rearwardly, as clearly shown in Fig. 1. The upper end of said handle may be provided with a rubber or similar grip 29.

Also journaled on the spacing sleeve 26, between the legs of the handle member 27, is the hub 30 of the supporting and actuating wheel 31. To the medial portion of said hub there is welded or otherwise rigidly secured a circular plate 32 which is stamped to serpentine conformation to provide a series of circumferentially spaced undulating cams 33 alternating to each side of the center plane of the wheel. The serpentine plate is surrounded by and rigidly secured to a rim 34 upon which is mounted a resilient tire 35.

The cross member 17 of the shear frame 15 has an upstanding stud 36 rigidly secured to it, which stud journals the bearing sleeve 37 of an elongated plate-like actuating member 38, a nut 39 threaded on the upper end of the stud serving to retain said member in position. The rearward portion of the actuating member 38 is bifurcated, providing a pair of legs 40 which straddle the supporting wheel 31 and extend chordally alongside the lower sector thereof, as shown in Figs. 2 and 3. A block 41 of hard or vulcanized fiber and of substantially the shape shown in Fig. 11, is secured to the rearward end of each leg 40, with the opposed tips of the blocks being spaced apart substantially the thickness of the wheel disk 32 and engaging the opposite faces of its undulatory cams 33, whereby upon rotation of the wheel oscillatory motion will be transmitted to the actuating member 38.

The parts are so proportioned that the tips of the blocks 41 engage the wheel cams on a radius thereof which is perpendicular to the plane of oscillation of the actuating member 38; in other words, directly below the axle 25 when the machine is in its normal operating position on level ground, as shown in Figs. 1 and 5. By so locating the blocks all tendency of the wheel cams to impart an upward or downward thrust component on the actuating member is eliminated. In prior machines of this type wherein the cam followers have been located either forwardly or rearwardly of the vertical plane of the wheel axis, it has been found that the upward or downward thrust imparted to the actuating member by the cams tends to cant the member upon its pivot and thus greatly accelerates wear thereon. This soon progresses to a stage where the engagement between the shear blades is impaired to the point that their shearing action is so erratic as to make it necessary to traverse each section of the lawn several times in order to secure a satisfactory cut. Also, with the shear frame free to rise and fall as here and with the cam followers engaging the cams forwardly of the wheel axis, when drawing the machine backward preparatory to making another traverse, the upward thrust component has been sufficient to cause the shear frame to flop up and down violently and noisily. But by so locating the follower blocks 41 as to contact the wheel cams 33 in the vertical plane of the wheel axis, all thrust imparted to the actuating member 38 is in horizontal directions (either lateral or fore-and-aft) which in no wise affect the shear tension or operation, or tend to cause any flopping of the shear frame.

A flat spring 45, of the shape best shown in Fig. 10, is secured to the forward end of the actuating member 38 by rivets 46. The forward portion of this spring is provided with a pair of laterally spaced apertures 47, and the medial portion of the forward edge of the spring is provided with a downward projection or ear 48 adapted to contact the medial portion of the upper surface of the oscillatory shear blade 49 at a single point. As best shown in Fig. 12, this blade has a plurality of forwardly extending radiating teeth 50, and its body portion rigidly carries a pair of transversely spaced upstanding pins 51 which are adapted to be freely slidably received in the apertures 47 of the spring member 45, as shown in Figs. 1, 2, 5 and 6.

The rearward portion of the movable blade 49 rests upon and freely slides over the upper surface of the raised boss 23 carried by the lower fixed blade 20. The said boss is of such height as to give a slight forward inclination to the upper blade 49 and as the latter is continuously pressed downwardly by the spring 45 it results that when the teeth 50 of the movable blade are intermediate those of the fixed blade, as shown in Fig. 2, the said teeth 50 incline somewhat into the spaces between the teeth 22 of the lower blade. As the upper teeth move into alinement with the lower ones the spring 45 yields to enable the forward portions of the teeth 50 to rise and slide over the lower teeth, and during this action the shearing edges of the two sets of teeth are maintained in intimate contact throughout their length, producing a true and effective shearing action.

While the boss 23 is here shown as being carried by the lower blade 20, obviously it might be formed on and project downwardly from the upper blade, with the upper surface of the lower blade being flat; or, complemental bosses might be formed on the two blades.

The upper blade 49 is maintained in position on the lower blade 20 solely by the downward pressure of the spring 45, and the pin connections 51 between the said spring and upper blade serve not only to transmit oscillatory motion to the blade from the actuating member 38 but also to prevent slueing of the blade from longitudinal alinement with the actuating member. The one point medial contact between the spring and upper blade, provided by the ear 48 of the spring, coupled with the support of the rear portion of the blade on the raised bearing boss 23, and the sliding fit of the pins 51 in the spring apertures 47, all combine to provide a full floating mounting of the blade 49 which enables it to accommodate itself not only to slight manufacturing irregularities in the teeth of either blade but also, within limits, to actual bending or misalinement of the teeth resulting from their striking stones, copings or other hard obstructions in the use of the machine.

The respective shear blades are in themselves fairly rigid, being stamped from sheet metal of about one-eighth inch in thickness and subsequently hardened and ground. The dies which remove the metal from between the blade teeth 22 and 50 are so formed and function in the course of the stamping operation as to produce raised flanges or lands 52 along the edges of the teeth (see Figs. 2, 8 and 9), and by flat grinding the surfaces 53 of these flanges it is possible to produce sharp even cutting edges on the teeth, both in the course of manufacture and in resharpening the teeth after use, more easily and efficiently than by grinding the tooth faces 54, as is common practice.

The force exerted by the spring 45 on the blade 49 may be readily varied by adjustment of the nut 39 on the pivot stud 36, to secure the most effective shearing action.

Although the shear frame 15 and the handle 28 are independently swingable about the wheel axis, so that the frame may freely rise and fall to follow unevennesses in the ground surface without corresponding movements of the handle, it is desirable to interengage them at a certain point in their angular relationship to one another in order that by depressing the handle the frame may be elevated to enable the shear to clear an unusual obstruction. The point of coupling should be somewhat variable so that the handle may be disposed at the inclination best suited to the height of the operator, and a simple but effective means has been provided whereby to readily vary the point of interengagement as occasion may require.

As best shown in Figs. 1 and 4, this means comprises a rectangular block 55 pivotally mounted on the inside of one of the frame side plates 16 in position for its edge faces to be engaged by a leg of the U-shaped handle member 27. The pivot 56 passes through the block eccentrically thereof so that each of the four edge faces of the block is at a different distance from the axis of the pivot. By manually moving the block about the pivot to present different edge faces thereof for engagement by the leg of the handle member 27, the angular relationship of the handle to the shear frame at the time of engagement may be varied, as indicated in Fig. 4, wherein two of the positions are illustrated in full and broken lines respectively. A spring washer 57 is interposed between the block and the head of the pivot 56, to provide sufficient friction to hold the block in any set position against unintentional displacement therefrom.

A further feature of the machine resides in the provision of a supplemental edging cutter mounted upon the shear frame 15 in a special manner, and usable to sever grass overgrowing the edges of walks, copings, etc. This cutter comprises a sharpened disk 60 journaled upon a stud 61 carried by an angle bracket 62 which is welded or otherwise rigidly secured to one of the side plates 16 of the frame, adjacent the edge thereof. When the frame is in its normal position for operation of the shear mechanism the disk 60 occupies an elevated inoperative position toward the rear of the machine, as shown in Figs. 1, 3 and 6. When it is desired to cut blades of grass occupying a more or less horizontal position and extending over the edge of a pavement or coping, the frame 15 is swung upward about the wheel axle 25 to a rearwardly and upwardly inclined position above the handle structure, thus lowering the edging disk 60 into engagement with the ground, as shown in Fig. 7. The machine is then traversed with the disk 60 in engagement with or proximity to the side of the coping or pavement, and its cutting edge severs the horizontal grass blades. The parts are so proportioned that when the frame 15 is in this position the machine is supported solely by the edging cutter 60, with the wheel 31 out of ground engagement, and thus when the machine is traversed the said wheel will not be rotated nor the shear mechanism operated.

The bracket 62 is so positioned on the frame 15 that when the parts are in the Fig. 7 positions, the stud 61 which journals the edging disk 60 is located forwardly of the wheel axle 25, which is the pivot about which the frame 15 swings. It results from this disposition of the edging disk that the weight of the machine plus the downward force exerted by the operator through the handle 28 tend to turn the frame in a clockwise direction about the axle 25, the effect of which is to maintain the end of the pivot stud 36 jammed against the handle 28 and prevent the frame from flopping up and down or even being kicked over to its normal shear-operating position.

While one form of the invention has been illustrated and described, it will be apparent that variations may be made in the details of construction and precise arrangement of parts without departing from the spirit of the invention, and therefore it is not wished to be limited to the above disclosure except as may be required by the claims.

What is claimed is:

1. In a machine for trimming the edge portions of lawns, the combination of a ground-engaging wheel provided with a series of circumferentially spaced cams; an axle journaling said wheel; a shear frame mounting said axle and having a horizontal member disposed forwardly of the wheel; a toothed shear blade fixedly carried by and extending forwardly from said horizontal frame member; a second toothed shear blade floatingly superposed upon said fixed blade; an actuating member disposed above and pivotally mounted upon said horizontal frame member, the rearward portion of said actuating member being provided with elements engaging said wheel cams whereby horizontal oscillation may be imparted to the actuating member through rotation of the wheel; a flat spring fixedly carried by and extending forwardly from said actuating member and having a portion pressurally contacting the upper surface of the floating shear blade at a single medial point whereby to maintain yieldable engagement between the teeth of the two blades; and non-rigid connections between the spring and floating blade maintaining the latter in proper position and transmitting oscillatory motion thereto from the spring and actuating member.

2. In a machine for trimming the edge portions of lawns, the combination of a ground-engaging wheel provided with a series of circumferentially spaced cams; an axle journaling said wheel; a shear frame mounting said axle and having a horizontal member disposed forwardly of the wheel; a toothed shear blade fixedly carried by and extending forwardly from said horizontal frame member; a second toothed shear blade floatingly superposed upon said fixed blade and provided with a plurality of spaced upstanding pins; an actuating member disposed above and pivotally mounted upon said horizontal frame member, the rearward portion of said actuating member being provided with elements engaging said wheel cams whereby horizontal oscillation may be imparted to the actuating member through rotation of the wheel; and a flat spring fixedly carried by and extending forwardly from said actuating member and pressurally engaging the upper surface of the floating shear blade at a single medial point whereby to maintain yieldable engagement between the teeth of the two blades, said spring also having a plurality of spaced apertures slidably receiving the pins of said floating shear blade.

3. In a machine for trimming the edge portions of lawns, the combination of a ground-engaging wheel provided with a series of circumferentially spaced cams; an axle journaling said wheel; a shear frame mounting said axle and having a horizontal member disposed forwardly of the wheel; a toothed shear blade fixedly carried by and extending forwardly from said horizontal frame member; a second toothed shear blade floatingly superposed upon said fixed blade; a boss on the rear portion of one of said blades providing a sliding bearing for the complemental portion of the other blade and imparting a forward downward inclination to the floating blade; an actuating member disposed above and pivotally mounted upon said horizontal frame member, the rearward portion of said actuating member being provided with elements engaging said wheel cams whereby horizontal oscillation may be imparted to the actuating member through rotation of the wheel; a flat spring fixedly carried by the forward portion of said actuating member, said spring being provided with a medial downward projection pressurally contacting the upper surface of the floating shear blade at a single medial point whereby to maintain yieldable engagement between the teeth of the two blades; and non-rigid connections between the spring and floating blade maintaining the latter in proper position and transmitting oscillatory motion thereto from the spring and actuating member.

4. In a machine for trimming the edge portions of lawns, the combination of a ground-engaging wheel provided with a series of circumferentially spaced cams; an axle journaling said wheel; a shear frame mounting said axle and having a horizontal member disposed forwardly of the wheel; a toothed shear blade fixedly carried by and extending forwardly from said horizontal frame member; a second toothed shear blade floatingly superposed upon said fixed blade and provided with a plurality of spaced upstanding pins; a boss on the medial rear portion of one of said blades providing a sliding bearing for the complemental portion of the other blade and imparting a forward downward inclination to the floating blade; a horizontal longitudinally extending actuating member pivotally mounted on said frame member, the rearward portion of said actuating member being provided with cam followers engaging said wheel cams whereby horizontal oscillation may be imparted to the actuating member through rotation of the wheel; and a flat spring fixedly carried by and extending forwardly from said actuating member, the forward edge portion of said spring being provided with a medial downward projection pressurally contacting the upper surface of the floating shear blade at a single medial point whereby to maintain yieldable engagement between the teeth of the two blades, said spring also having a plurality of spaced apertures slidably receiving the pins of said floating blade.

5. In a machine for trimming the edge portions of lawns, the combination of a ground-engaging wheel provided with a series of circumferentially spaced cams; an axle journaling said wheel; a traversing handle journaled on said axle; a shear frame mounting said axle and swingable about the axis thereof relative to said handle, said frame having a portion extending forwardly of the wheel; a toothed shear blade fixedly carried by said forwardly extending portion of the frame; a second toothed shear blade movably superposed upon said fixed blade in shearing engagement therewith; a longitudinally extending actuating member pivotally mounted upon said shear frame for horizontal oscillatory movements, the rearward portion of said actuating member extending chordally of the wheel laterally adjacent the cammed portion thereof and having cam engaging elements contacting the cams on a radius of the wheel which is normal to the plane of oscillation of said actuating member, whereby the cams impart only horizontal thrust to the actuating member thus substantially preventing vibrations of the shear frame relative to said handle; and driving connections between said movable shear blade and the actuating member whereby the latter may oscillate the former.

6. In a machine for trimming the edge portions of lawns, the combination of a ground-engaging wheel provided with a series of circumferentially spaced cams; an axle journaling said wheel; a shear frame mounting said axle and swingable about the axis thereof, said frame having a horizontal member disposed forwardly of the wheel; a toothed shear blade fixedly carried by and extending forwardly from said horizontal frame member; a second toothed shear blade floatingly superposed upon said fixed blade; a longitudinally extending bifurcated actuating member disposed above and pivotally mounted upon said horizontal frame member, the legs of said actuating member straddling the lowest sector of said wheel; a cam engaging element carried by each leg of said actuating member, the cam contacting portions of said elements being disposed on a radius of the wheel which is normal to the plane of oscillation of said actuating member, whereby the cams may impart horizontal oscillatory movements to the actuating member without upward or downward thrust components; a flat spring fixedly carried by and extending forwardly from the actuating member and pressurally contacting the upper surface of the floating shear blade at a single medial point whereby to maintain yieldable engagement between the teeth of the two blades; and driving connections between the spring and the floating shear blade for transmitting the oscillatory motion of the actuating member and spring to said blade.

7. In a machine for trimming the edge portions of lawns, the combination of a ground-engaging cam carrying wheel; an axle journaling said wheel; a shear frame having side plates mounting said axle, said frame being swingable vertically about the wheel axis; shear mechanism carried by the frame forwardly of the wheel and operable by the cams thereof; a rearwardly inclined traversing handle pivotally mounted by the axle and swingable thereabout independently of the shear frame; and a block having a plurality of edge faces, said block being pivotally mounted on one of the frame side plates in position for said edge faces to be engaged by a portion of said handle, the pivot of said block being eccentric thereof so that the several edge faces of the block are unequally spaced from the pivot, whereby by turning the block to present different edge faces for engagement by the handle the angularity of the latter relative to the frame may be varied.

ARTHUR E. MILLER.

References Cited in the file of this patent

UNITED STATES PATENTS

| Number | Name | Date |
|---|---|---|
| 1,071,110 | Stover | Aug. 26, 1913 |
| 1,654,574 | Brown | Jan. 3, 1928 |
| 1,770,434 | Schlicher | July 15, 1930 |
| 2,484,795 | Schofield | Oct. 11, 1949 |
| 2,503,348 | Miller | Apr. 11, 1950 |
| 2,574,947 | Allen | Nov. 13, 1951 |